(12) United States Patent
Yoshida et al.

(10) Patent No.: US 8,026,688 B2
(45) Date of Patent: Sep. 27, 2011

(54) DRIVING DEVICE

(75) Inventors: Ryuichi Yoshida, Sakai (JP); Hirohisa Sueyoshi, Sakai (JP); Satoshi Shinke, Sakai (JP); Shinichi Yamamoto, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 557 days.

(21) Appl. No.: 12/296,321

(22) PCT Filed: Apr. 10, 2007

(86) PCT No.: PCT/JP2007/057873
§ 371 (c)(1),
(2), (4) Date: Oct. 7, 2008

(87) PCT Pub. No.: WO2007/119713
PCT Pub. Date: Oct. 25, 2007

(65) Prior Publication Data
US 2009/0160372 A1 Jun. 25, 2009

(30) Foreign Application Priority Data
Apr. 11, 2006 (JP) .................................. 2006-108275

(51) Int. Cl.
*H02N 2/02* (2006.01)
(52) U.S. Cl. ......... 318/631; 318/116; 318/119; 318/135
(58) Field of Classification Search .................... 318/38, 318/116, 119, 135, 162, 631, 686, 687; 310/311
See application file for complete search history.

(56) References Cited

U.S. PATENT DOCUMENTS

| | | | |
|---|---|---|---|
| 6,229,245 B1 * | 5/2001 | Kitani ...................... 310/316.02 |
| 6,351,054 B1 * | 2/2002 | Cabuz et al. ................... 310/309 |
| 6,701,037 B2 * | 3/2004 | Staple et al. ..................... 385/18 |
| 6,836,029 B2 * | 12/2004 | Greenberg et al. ........... 307/139 |
| 6,950,266 B1 * | 9/2005 | McCaslin et al. ............... 360/75 |
| 6,954,023 B2 * | 10/2005 | Hata et al. ...................... 310/328 |
| 7,256,467 B2 * | 8/2007 | Reid et al. ...................... 257/415 |
| 7,355,777 B2 * | 4/2008 | Oden et al. ..................... 359/245 |

FOREIGN PATENT DOCUMENTS

EP 0 917 214 A2 * 5/1999

(Continued)

OTHER PUBLICATIONS

Korean Intellectual Property Office "Notice of Office Action" dated Jul. 23, 2010, for the corresponding Korean Patent Application No. 10-2008-7022963, together with an English-language translation thereof.

(Continued)

*Primary Examiner* — Bentsu Ro
(74) *Attorney, Agent, or Firm* — Sidley Austin LLP

(57) ABSTRACT

In order to provide a driving device that is capable of eliminating sticking of a movable member due to nonuse, the driving device includes a drive shaft that reciprocates in axial directions with expansion and contraction of an electromechanical transducer element, a movable member that frictionally engages with the drive shaft, and a drive circuit that inputs drive voltage into the electromechanical transducer element, the drive circuit outputting drive operation pattern voltage having a frequency (fd1') lower than a resonance frequency (fr) of the electromechanical transducer element and lower than a frequency (fd1) that maximizes moving velocity of the movable member and sticking elimination pattern voltage having a frequency lower than the frequency (fd1') of the drive operation pattern voltage and in vicinity of a frequency (fd2) that maximizes thrust acting on the movable member.

18 Claims, 4 Drawing Sheets

FOREIGN PATENT DOCUMENTS

| | | | | |
|---|---|---|---|---|
| JP | 11-206156 | A | * | 7/1999 |
| JP | 11-225488 | A | * | 8/1999 |
| JP | 2000-156986 | A | * | 6/2000 |
| JP | 2004-15864 | A | * | 1/2004 |
| JP | 2004-104919 | A | * | 4/2004 |
| WO | WO 2007/119713 | A1 | * | 10/2007 |

OTHER PUBLICATIONS

Notification of Transmittal of Translation of the International Preliminary Search Report on Patentability and translation of Written Opinion of the International Searching Authority concerning International Application No. PCT/JP2007/057873.

* cited by examiner

Fig. 3

STICKING ELIMINATION PATTERN

| STEP | STICKING ELIMINATION FREQUENCY fd2 (kHz) | DUTY RATIO Du2 | NUMBER OF PULSES |
|---|---|---|---|
| 1 | 114.5 | 0.30 | 7,299 |
| 2 | 114.5 | 0.70 | 7,299 |
| 3 | 115.6 | 0.30 | 7,244 |
| 4 | 115.6 | 0.70 | 7,244 |
| 5 | 116.8 | 0.30 | 7,152 |
| 6 | 116.8 | 0.70 | 7,152 |
| 7 | 118.0 | 0.30 | 7,080 |
| 8 | 118.0 | 0.70 | 7,080 |
| 9 | 119.2 | 0.30 | 7,010 |
| 10 | 119.2 | 0.70 | 7,010 |
| 11 | 120.4 | 0.30 | 6,941 |
| 12 | 120.4 | 0.70 | 6,941 |
| 13 | 121.5 | 0.30 | 6,874 |
| 14 | 121.5 | 0.70 | 6,874 |

(STICKING ELIMINATION PATTERN : fd1' =126kHz, Du=0.34/0.66)

(A)

(B)

(A)

(B)

DRIVING DEVICE

RELATED APPLICATIONS

This application is a National Stage of International Application No. PCT/JP2007/057873, filed Apr. 10, 2007, which is based on Japanese Patent Application No. 2006-108275, the entire contents of which is incorporated herein by reference.

TECHNICAL FIELD

The present invention relates to a driving device.

BACKGROUND ART

In Patent Document 1 is disclosed a driving device for reciprocating a drive shaft in axial directions by expansion and contraction of an electromechanical transducer element and sliding, on the drive shaft, a movable member that frictionally engages with the drive shaft, wherein the device performs self-maintenance by moving the movable member across a total length of the drive shaft for purpose of cleaning the drive shaft as well as positioning the movable member.

In such a driving device, not only may a driving force be decreased by soil on the drive shaft but continuation of nonuse may temporarily increase a frictional force of the movable member against the drive shaft, thus making it difficult or impossible to move the movable member. That is, there may be caused a phenomenon in which the movable member sticks to the drive shaft.

Patent Document 1: JP 2004-15864 A
Patent Document 2: JP 2004-104919 A

DISCLOSURE OF INVENTION

Problems to Be Solved by the Invention

An object of the invention is to provide a driving device that is capable of eliminating sticking of a movable member due to nonuse.

Means for Solving Problem

In order to achieve the object, the driving device according to the invention comprises a drive shaft that reciprocates in axial directions with expansion and contraction of an electromechanical transducer element, a movable member that frictionally engages with the drive shaft, and a drive circuit that inputs drive voltage into the electromechanical transducer element, wherein the drive circuit outputs a drive operation pattern voltage having a frequency (fd1') lower than a resonance frequency (fr) of the electromechanical transducer element and lower than a frequency (fd1) that maximizes moving velocity of the movable member and a sticking elimination pattern voltage having a frequency lower than the frequency (fd1') of the drive operation pattern voltage and in vicinity of a frequency (fd2) that maximizes thrust acting on the movable member.

In this configuration, the frequency (fd1) that maximizes the moving velocity of the movable member is lower than the resonance frequency (fr) of the electromechanical transducer element, and the frequency (fd2) that maximizes the thrust acting on the movable member is lower than the frequency (fd1) that maximizes the moving velocity of the movable member. Thus the movable member can efficiently be moved proportionally to a quantity of input into the electromechanical transducer element by the drive operation pattern voltage having the frequency in vicinity of the frequency (fd1) that provides the high moving velocity of the movable member. Furthermore, sticking of the movable member to the drive shaft can be eliminated by the sticking elimination pattern voltage having the frequency in vicinity of the frequency (fd2) that maximizes the thrust acting on the movable member.

In the driving device of the invention, the frequency (fd1') of the drive operation pattern voltage may be not lower than 0.75 time and not higher than 0.85 time the resonance frequency (fr) of the electromechanical transducer element.

In this configuration, the frequency of the drive operation pattern voltage is set so as to be close to the frequency that maximizes the moving velocity of the movable member and so as not to be too close to the resonance frequency fr. Thus variation in driving velocity due to individual difference can be decreased while sufficiently high driving velocity can be obtained.

In the driving device of the invention, output duration of the sticking elimination pattern voltage may be not longer than 1000 msec.

Provided that the movable member is stuck, the sticking can generally be eliminated by continuous application for 1000 msec of even the normal drive operation pattern voltage. Accordingly, it is useless to apply the sticking elimination pattern voltage for a duration exceeding 1000 msec.

In the driving device of the invention, the sticking elimination pattern voltage may be alternate repetition with cycles of specified unit time of a waveform that slowly expands and then rapidly contracts the electromechanical transducer element and of a waveform that rapidly expands and then slowly contracts the electromechanical transducer element.

In this configuration, the sticking of the movable member can easily be eliminated because the thrust can be exerted on the movable member in both opposite directions and because sites on which the thrust is exerted and concentrated can be changed. Even when the movable member is at an end of a mechanical stroke thereof, the sticking can be eliminated by the exertion of the thrust in a direction in which the member can be moved.

In the driving device of the invention, the unit time may be not longer than 100 msec.

Thus the thrust can be exerted on the movable member in both opposite directions with a satisfactory balance so that the sticking can be eliminated in a short period of time.

In the driving device of the invention, the unit time may be a half of a period of natural vibration of the movable member.

In this configuration, movement of the movable member can be facilitated and the sticking can easily be eliminated by resonance that is caused by application of the thrust according to a natural frequency of the movable member.

In the driving device of the invention, a waveform of the sticking elimination pattern voltage may be different from that of the drive operation pattern voltage.

In this configuration, the sticking of the movable member can efficiently be eliminated by application of the sticking elimination pattern voltage having the waveform that provides a thrust higher than that caused by the drive operation pattern voltage.

In the driving device of the invention, the frequency of the sticking elimination pattern voltage may be swept within a range of ±3% relative to the frequency (fd2) that maximizes the thrust acting on the movable member.

In this configuration, the maximum thrust can be exerted on the movable member and the sticking can efficiently be eliminated by the change in the sticking elimination pattern voltage within the predetermined range, on condition that frequency characteristics of the electromechanical transducer element change in accordance with environment of use such as temperature.

In the driving device of the invention, the drive operation pattern voltage and the sticking elimination pattern voltage may both have rectangular waveforms and a duty ratio of the sticking elimination pattern voltage may be different from that of the drive operation pattern voltage.

In such a type of the driving device as performs driving with rectangular waves, a duty ratio that maximizes the velocity of the movable body is different from a duty ratio that maximizes the thrust of the movable body. Therefore, the sticking can reliably be eliminated while drive efficiency can be optimized, by setting of the duty ratio of the drive operation pattern voltage such that the velocity of the movable member is heightened and setting of the duty ratio of the sticking elimination pattern voltage such that the thrust is heightened.

In the driving device of the invention, the duty ratio of the sticking elimination pattern voltage may be in vicinity of 0.3 or in vicinity of 0.7.

The thrust acting on the movable member is maximized with the duty ratio being about 0.3 or about 0.7 depending on a direction of the drive. Accordingly, the sticking can easily be eliminated by setting of the duty ratio of the sticking elimination pattern voltage in vicinity of the values.

In the driving device of the invention, a difference between the frequency (fd1') of the drive operation pattern voltage and the frequency (fd2) that maximizes the thrust acting on the movable member may be not less than 3% of the frequency (fd2) that maximizes the thrust acting on the movable member.

In this configuration, the thrust exerted by the sticking elimination pattern voltage on the movable member can be set so as to be significantly larger than the thrust exerted by the drive operation pattern voltage on the movable member, so that the sticking of the movable member can easily be eliminated.

In the driving device of the invention, the sticking elimination pattern voltage may be alternate repetition of a waveform that moves the movable member in a direction toward an extremity of the drive shaft and a waveform that moves the movable member in a direction toward a root of the drive shaft.

In this configuration, the sticking of the movable member can easily be eliminated because the thrust can be exerted on the movable member in both opposite directions and because sites on which the thrust is exerted and concentrated can be changed. Even when the movable member is at an end of the mechanical stroke thereof, the sticking can be eliminated by the exertion of the thrust in a direction in which the member can be moved.

In the driving device of the invention, the sticking elimination pattern voltage may be outputted upon at least any of power-on, reset action, and suspension of output of the drive operation pattern voltage for a predetermined period of time.

In this configuration, the sticking elimination pattern voltage is applied on condition that stationary state of the movable member continues. Thus occurrence of a gap can be prevented between a quantity of input of the drive operation pattern voltage and a quantity of movement of the movable member.

Effects of the Invention

In the present invention, the sticking of the movable member to the drive shaft is eliminated by the application of the sticking elimination pattern voltage, so that the movable member can be moved proportionally to the quantity of input of the drive operation pattern voltage.

BRIEF DESCRIPTION OF THE DRAWINGS

FIG. 3 is a list of sticking elimination pattern voltage in the driving device of FIG. 1.

EXPLANATIONS OF LETTERS OR NUMERALS

1 . . . driving device
3 . . . electromechanical transducer element
4 . . . drive shaft
5 . . . movable member
6 . . . drive circuit

BEST MODE FOR CARRYING OUT THE INVENTION

Hereinbelow, an embodiment of the invention will be described with reference to the drawings.

Figure 1:
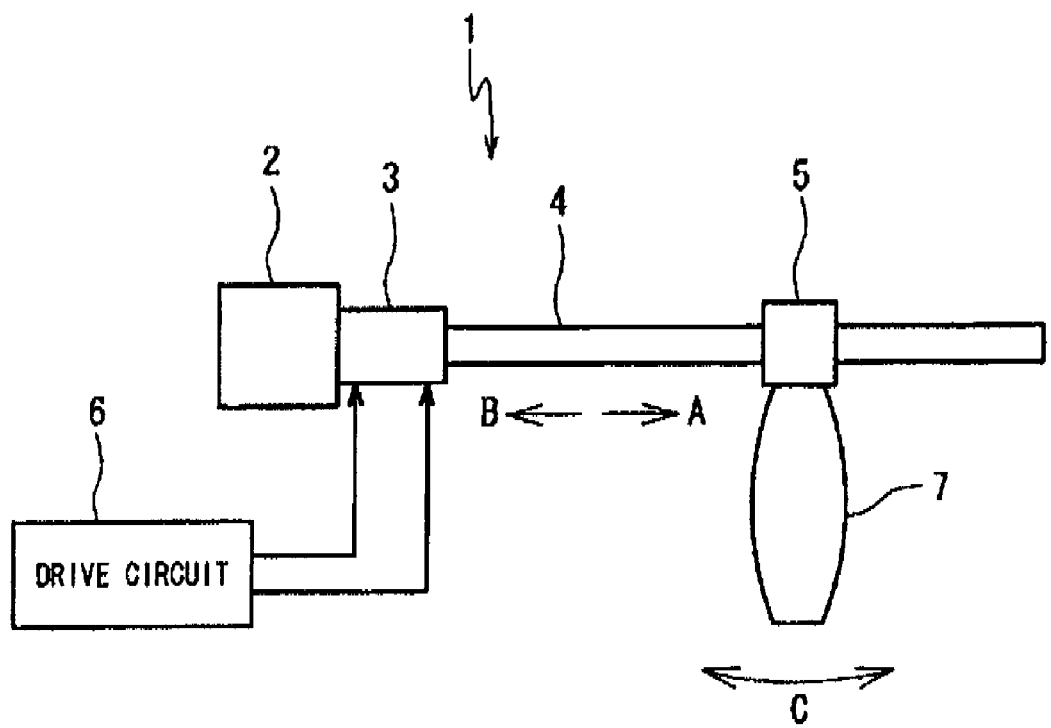
FIG. 1 is a schematic diagram of a driving device of the invention.

FIG. 1 shows a configuration of a driving device 1 in accordance with the invention. The driving device 1 is composed of a weight 2, an electromechanical transducer element 3 (e.g., piezoelectric element) having one end fixed to the weight 2, a rod-like drive shaft 4 having one end fixed to the other end of the electromechanical transducer element 3, a movable member 5 that frictionally engages with the drive shaft 4, and a drive circuit 6 that applies drive voltage to the electromechanical transducer element 3, the movable member 5 supporting a driven member 7.

In the driving device 1, the electromechanical transducer element 3 expands and contracts in directions of arrows A and B in accordance with the applied voltage. With the expansion and contraction of the electromechanical transducer element 3, the drive shaft 4 reciprocates in axial directions (the directions of the arrows A and B). When the drive shaft 4 slowly moves, the movable member 5 moves with the drive shaft 4. When the drive shaft 4 rapidly moves, however, the movable member 5 tends to stay through action of an inertial force of itself and thereby slides relative to the drive shaft 4.

The drive circuit 6 outputs, for the electromechanical transducer element 3, sticking elimination pattern voltage for eliminating sticking of the movable member 5 to the drive shaft 4, as well as drive operation pattern voltage for positioning the movable member 5 relative to the electromechanical transducer element 3.

Figure 2:
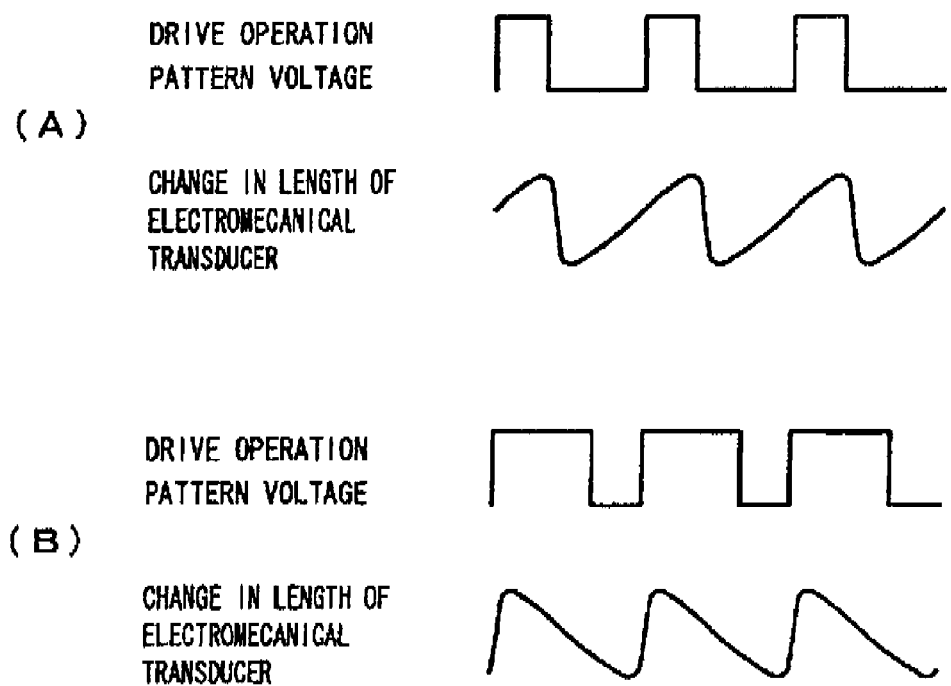
FIG. 2 are graphs showing waveforms of drive operation pattern voltage and of displacement of an electromechanical transducer element in the driving device of FIG. 1.

FIG. 2 show waveforms of the drive operation pattern voltages outputted from the drive circuit 6 and change in length of the electromechanical transducer element 3, i.e., position of the drive shaft 4 in the axial direction that corresponds to the drive operation pattern voltage. The embodiment obtains sawtoothed displacement of the drive shaft 4 from rectangular waves inputted into the electromechanical transducer element 3 and makes use of transfer characteristics of displacement with respect to drive voltage (change in gain and phase according to frequency) in the electromechanical transducer element 3 to which the drive shaft 4 is fixed. FIG. 2(A) shows an operation in which the movable member 5 is moved in the direction of the arrow A, and FIG. 2(B) shows an operation in which the movable member 5 is moved in the direction of the arrow B.

In a configuration of FIG. 1, normally, a frequency fd1 that maximizes moving velocity of the movable member 5 generally coincides with a frequency fd2 that maximizes thrust acting on the movable member 5. In the driving device 1 of the embodiment, however, the frequency fd1 that maximizes the moving velocity of the movable member 5 and the frequency fd2 that maximizes the thrust acting on the movable member 5 are made different with a selection of resonance frequencies disclosed in Patent Document 2 (JP 2004-104919 A), that is, with setting of the resonance frequencies based on selection of lengths, outside diameters, and weights of the weight 2, the electromechanical transducer element 3, and the drive shaft 4.

Specifically, the weight 2 is made of tungsten material shaped like a column with a diameter of 2 mm and a length of 1 mm, the electromechanical transducer element 3 is made of PZT particle material shaped like a column with a diameter of 1.2 mm and a length of 3.3 mm, and the drive shaft 4 is made of carbon material shaped like a column with a diameter of 1 mm and a length of 9.8 mm.

In this configuration, a resonance frequency fr of the electromechanical transducer element 3 is 168 kHz, the frequency fd1 that maximizes the moving velocity of the movable member 5 is 143 kHz, and the frequency fd2 that maximizes the thrust acting on the movable member 5 is 118 kHz.

The drive frequency fd1 of the drive operation pattern voltage that is ideal for sliding the movable member 5 with a difference between velocities of the expansion and contraction of the electromechanical transducer element 3 is 0.8 to 0.9 times the resonance frequency fr of the electromechanical transducer element 3. The closer to the resonance frequency fr the drive frequency is, however, the larger a variation caused by individual difference becomes. Accordingly, the driving device 1 is driven with a drive operation frequency fd1' that is 0.75 to 0.8 times (e.g., 126 kHz) the resonance frequency fr so that a value of {3σ (standard deviation) subtracted from mean value} is maximized. A duty ratio Du1 of the drive operation pattern voltage is set at 0.34 when the movable member 5 is slid in the direction A and is set at 0.66 when the movable member 5 is slid in the direction B.

FIG. 3 exemplifies a list of the sticking elimination pattern voltage for the driving device 1. On condition that long time elapses without application of the drive voltage to the electromechanical transducer element 3 and with the movable member 5 engaging with the same position on the drive shaft 4 in the driving device 1, a temporary increase in a frictional force of the movable member 5 against the drive shaft 4 may make the movable member 5 stick to the drive shaft 4. The sticking elimination pattern voltage is outputted for eliminating such sticking of the movable member 5.

The sticking elimination pattern voltage is rectangular wave voltage having the same voltage (amplitude) as the drive operation pattern voltage but 14 patterns of voltage different in frequency and duty ratio are sequentially outputted in order, as shown. Number of output pulses of the drive operation pattern voltage is proportional to a distance over which the movable member 5 is to be moved, whereas number of output pulses of the sticking elimination pattern voltage is predetermined as shown in FIG. 3.

A unit time required for output of the drive voltage in each step of the drive operation pattern voltage is constantly about 30 msec. The unit time is generally equal to a half of a period of natural vibration of the movable member 5 including the driven member 7 on the drive shaft 4 as shown by an arrow C in FIG. 1. A duration required for output of all the 14 steps is 420 msec.

Steps of odd number in the sticking elimination pattern voltage each have a duty ratio of 0.30 and a waveform that causes the movable member 5 to slide in the direction of the arrow A by slowly expanding and then rapidly contracting the electromechanical transducer element 3. Steps of even number each have a duty ratio of 0.70 and a waveform that causes the movable member 5 to slide in the direction of the arrow B by rapidly expanding and then slowly contracting the electromechanical transducer element 3.

The sticking elimination frequency fd2 of the sticking elimination pattern voltage is swept so as to change by percents within a range of ±3% relative to 118.0 kHz of steps 7, 8.

In the driving device 1, the drive circuit 6 automatically outputs the sticking elimination pattern voltage upon power-on and reset action and on condition that output of the drive operation pattern voltage has been ceased for a predetermined period of time. Once the drive circuit 6 outputs the sticking elimination pattern voltage, the driving device 1 subsequently performs an operation for returning to origin.

Hereinbelow will be described effects of the application of the sticking elimination pattern voltage.

FIG. 4(A) shows a relation between the moving velocity of the movable member 5 and frequency of the applied rectangular wave drive voltage, and FIG. 4(B) shows a relation between the thrust acting on the movable member 5 and the frequency of the applied rectangular wave drive voltage. The drawings show results measured at an environmental temperature of 20° C.

The moving velocity of the movable member 5 is calculated by measurement of position change of the movable member 5 in submicrons at intervals of 0.5 sec with use of a laser length measuring instrument with the drive operation pattern voltage applied continuously.

The thrust acting on the movable member 5 is measured with use of a compression-type load cell.

As described above, a frequency slightly lower than the frequency fd1 that maximizes the moving velocity of the movable member 5 is selected as the drive operation frequency fd1' and a frequency lower than the drive operation frequency fd1' is selected as the sticking elimination frequency fd2. Accordingly, the moving velocity of the movable member 5 that is obtained from the sticking elimination pattern voltage is lower than the moving velocity that is obtained from the drive operation pattern voltage.

In general, the thrust that acts so as to slide the movable member 5 relative to the drive shaft 4 is maximized by a frequency lower than the frequency fd1 that maximizes an amount of the movement of the movable member 5 and lower than the drive operation frequency fd1'. In the embodiment, therefore, the frequency fd2 (118 kHz) that maximizes the thrust acting on the movable member 5 is used as the sticking elimination frequency.

Even under the sticking condition in which the movable member 5 cannot be slid by the application of the drive operation pattern voltage, the application of the sticking elimination pattern voltage to the electromechanical transducer element 3 causes a larger thrust to act on the movable member 5 than the application of the drive operation pattern voltage and thus causes the movable member 5 to slide relative to the drive shaft 4. Once the movable member 5 having been stuck slides, the member returns to a condition in which a normal thrust can slide the member. Thus it is highly possible that the sticking condition of the movable member 5 can be eliminated by the application of the sticking elimination pattern voltage having the sticking elimination frequency fd2 lower than the drive operation frequency fd1'.

Though the sticking elimination frequency is made to coincide with the frequency fd2 that maximizes the thrust acting on the movable member 5 in the embodiment, the sticking elimination frequency may be in vicinity of the frequency fd2 that maximizes the thrust acting on the movable member 5.

In the embodiment, a difference between the drive operation frequency fd1' and the frequency fd2 that maximizes the thrust acting on the movable member 5 is about 6.8% relative to the frequency fd2 that maximizes the thrust acting on the movable member 5. This means that the thrust caused by the sticking elimination frequency on the movable member 5 is substantially larger than the thrust caused by the drive operation frequency fd1' on the movable member 5. On condition that the difference between the drive operation frequency fd1' and the frequency fd2 that maximizes the thrust acting on the movable member 5 is not less than 3%, the effect of the sticking elimination pattern voltage can be made significant in comparison with that of the drive operation pattern voltage.

Figure 5:
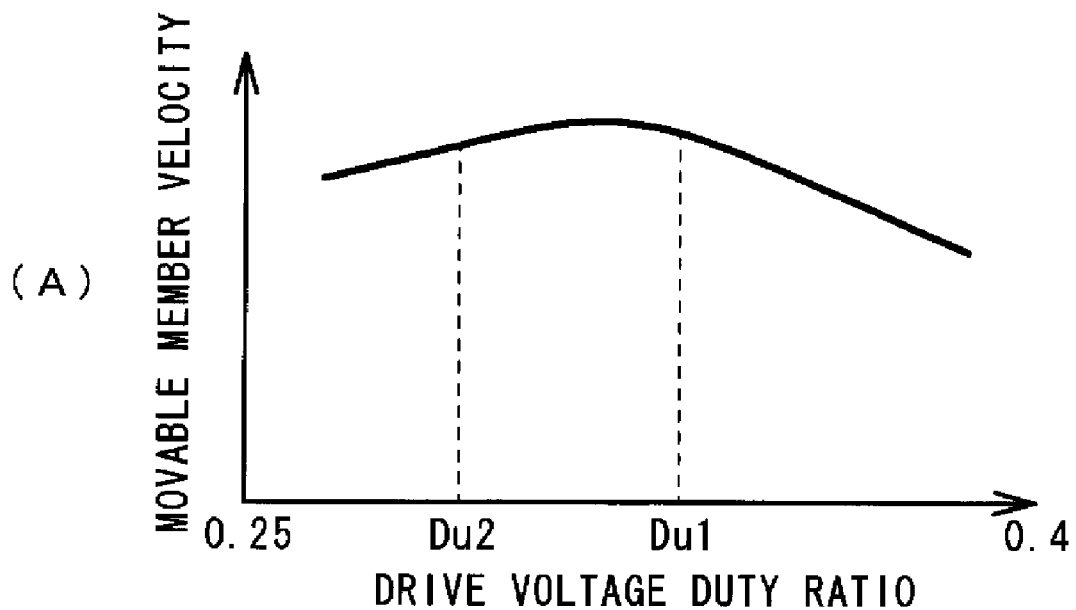
FIG. 5 are graphs showing characteristics of the velocity and thrust of the movable member with respect to duty ratio of drive voltage in the driving device of FIG. 1.
Figure 5:
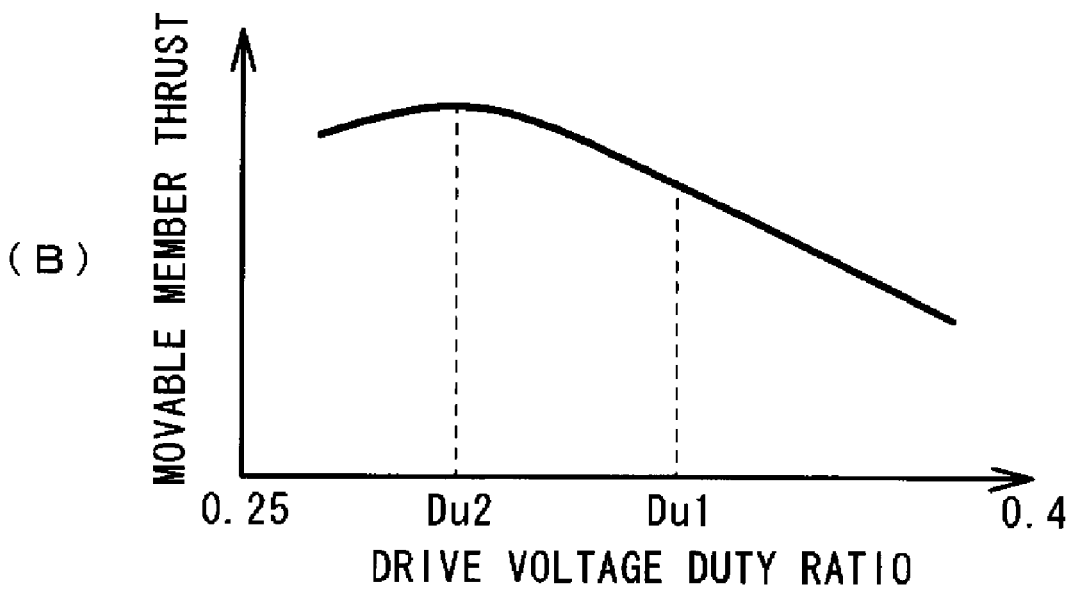

FIG. 5(A) shows a relation between the moving velocity of the movable member 5 and duty ratio of the applied rectangular wave drive voltage, and FIG. 5(B) shows a relation between the thrust acting on the movable member 5 and the duty ratio of the applied rectangular wave drive voltage (only in a range corresponding to the action in the direction A). The velocity and thrust of the movable member 5 have different peaks with respect to the duty ratio. Thus the duty ratio Du1 of the drive operation pattern voltage is set at a value (Du1=0.34) that makes the moving velocity of the movable member 5 as high as possible, and the duty ratio of the sticking elimination pattern voltage is set at a value (Du2=0.30) that makes the thrust acting on the movable member 5 as high as possible.

By the change in the duty ratio also, the stuck movable member 5 that cannot easily be moved by the drive operation pattern voltage can be made easily movable with the sticking elimination pattern voltage.

In the driving device 1, each step of the sticking elimination pattern voltage is repeated alternately in the direction A and in the direction B with cycles of the unit time that generally corresponds to the half of the natural vibration frequency of the movable member 5. Consequently, resonance of the movable member 5 makes the movable member easily slidable even with a small thrust.

Figure 4:
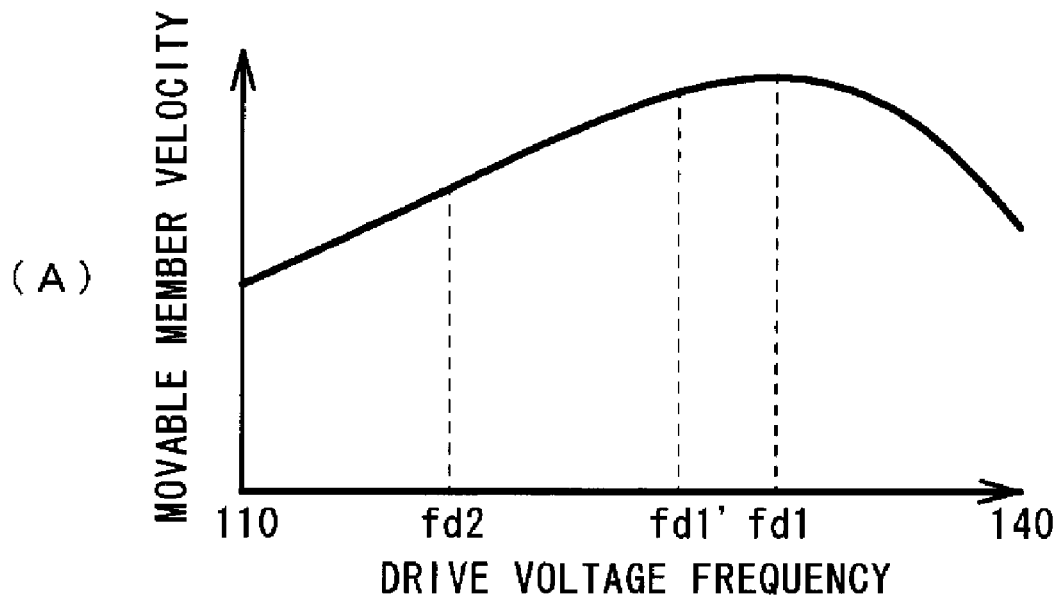
FIG. 4 are graphs showing characteristics of velocity and thrust of a movable member with respect to frequency of drive voltage in the driving device of FIG. 1.
Figure 4:
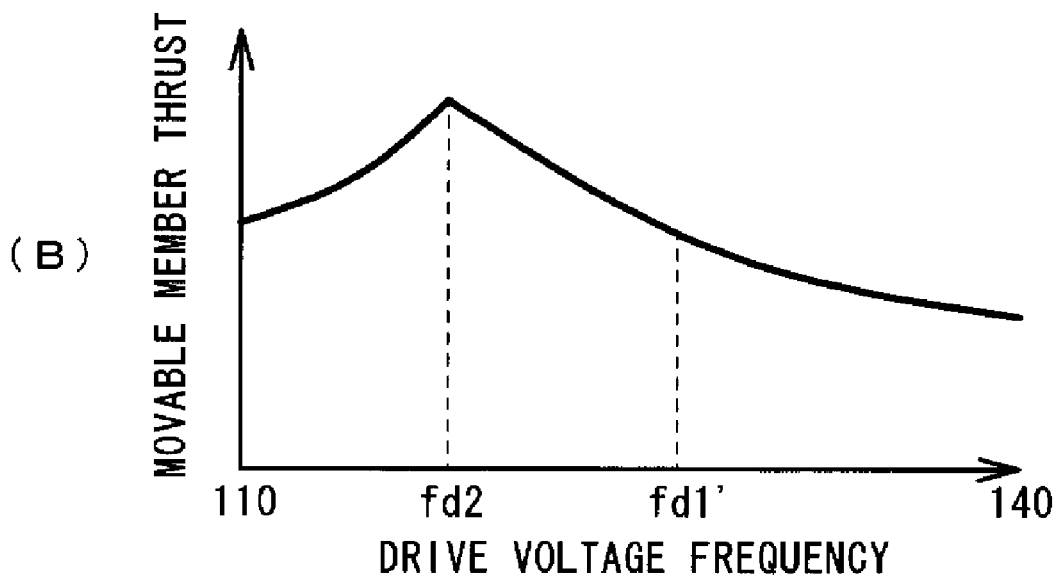

In such graphs as shown in FIG. 4, characteristics of the velocity and thrust of the movable member 5 with respect to the frequency shift (move in directions of a horizontal axis) with change in the environmental temperature. Thus the sticking elimination frequency fd2 of the sticking elimination pattern voltage is swept in order that the thrust may generally peak in at least any of the steps irrespective of the environmental temperature. In the embodiment, the sticking elimination frequency fd2 is swept within the range of ±3% because change in the environmental temperature within a range of ±40° C. relative to a reference of 20° C. causes shift on the order of ±3% in the frequency that provides the peak of the thrust of the movable member 5.

As described above, the driving device 1 of the embodiment applies, to the electromechanical transducer element 3, the sticking elimination pattern voltage optimized in parameters such as frequency, duty ratio, and unit time, in order to eliminate the sticking of the movable member 5 to the drive shaft 4. The invention, however, does not necessarily require the optimization in all the parameters.

For example, the thrust exerted by the sticking elimination pattern voltage on the movable member 5 may be directed in only one of the directions A and B. The sticking, however, can easily be eliminated by the exertion of the thrust in both the directions A and B that prevents the thrust from being concentrated only on specific sites in a contact surface between the movable member 5 and the drive shaft 4. Particularly, the alternate exertion in both the directions A and B is preferable because there is a danger that the exertion in only one direction may completely fail to function on occasion when the movable member 5 is at any one of the ends of the mechanical stroke thereof.

Though the unit time may be determined independently of the natural vibration frequency of the movable member 5, the unit time is preferably not longer than 100 msec in order to rapidly eliminate the sticking by balanced exertion of the thrust.

The sticking of the movable member 5 can be eliminated even by continuous application of voltage having the same waveform as the drive operation pattern voltage, and then almost all of the sticking is eliminated in 1000 msec or around. Under normal conditions, therefore, setting of the duration of the sticking elimination pattern voltage exceeding 1000 msec is not preferable because starting time becomes longer than is necessary and because energy loss increases.

In the embodiment, the number of the output pulses is changed in order to make the unit time strictly the same because the sticking elimination frequency fd2 is swept. It has to be understood, however, that variation in the unit time is on the order of ±3% and that the unit time for each step is generally uniform even if the number of pulses is not changed.

The embodiment is the driving device 1 that performs rectangular wave voltage driving. In sawtoothed voltage driving, similarly, a peak as for the velocity of the movable member is higher than a peak as for the thrust on the movable member. Therefore, the invention can be applied to driving devices that perform sawtoothed voltage driving.

The invention claimed is:

1. A driving device comprising a drive shaft that reciprocates in axial directions with expansion and contraction of an electromechanical transducer element, a movable member that frictionally engages with the drive shaft, and a drive circuit that inputs drive voltage into the electromechanical transducer element, the drive circuit outputting drive operation pattern voltage having a frequency (fd1') lower than a resonance frequency (fr) of the electromechanical transducer element and lower than a frequency (fd1) that maximizes moving velocity of the movable member and sticking elimination pattern voltage having a frequency lower than the frequency (fd1') of the drive operation pattern voltage and in vicinity of a frequency (fd2) that maximizes thrust acting on the movable member.

2. The driving device as claimed in claim 1, wherein the frequency (fd1') of the drive operation pattern voltage is not lower than 0.75 time and not higher than 0.85 time the resonance frequency (fr) of the electromechanical transducer element.

3. The driving device as claimed in claim 1, wherein output duration of the sticking elimination pattern voltage is not longer than 1000 msec.

4. The driving device as claimed in claim 1, wherein the sticking elimination pattern voltage is alternate repetition with cycles of specified unit time of a waveform that slowly expands and then rapidly contracts the electromechanical transducer element and of a waveform that rapidly expands and then slowly contracts the electromechanical transducer element.

5. The driving device as claimed in claim 4, wherein the unit time is not longer than 100 msec.

6. The driving device as claimed in claim 4, wherein the unit time is a half of a period of natural vibration of the movable member.

7. The driving device as claimed in claim 1, wherein a waveform of the sticking elimination pattern voltage is different from that of the drive operation pattern voltage.

8. The driving device as claimed in claim 1, wherein the frequency of the sticking elimination pattern voltage is swept within a range of ±3% relative to the frequency (fd2) that maximizes the thrust acting on the movable member.

9. The driving device as claimed in claim 1, wherein
the drive operation pattern voltage and the sticking elimination pattern voltage both have rectangular waveforms, and wherein
a duty ratio of the sticking elimination pattern voltage is different from that of the drive operation pattern voltage.

10. The driving device as claimed in claim 9, wherein the duty ratio of the sticking elimination pattern voltage is in vicinity of 0.3 or in vicinity of 0.7.

11. The driving device as claimed in claim 1, wherein the drive operation pattern voltage and the sticking elimination pattern voltage both have rectangular waveforms, and wherein the frequency (fd1') of the drive operation pattern voltage is not lower than 0.75 times and not higher than 0.85 times the resonance frequency (fr) of the electromechanical transducer element.

12. The driving device as claimed in claim 11, wherein a duty ratio of the sticking elimination pattern voltage is different from that of the drive operation pattern voltage.

13. The driving device as claimed in claim 1, wherein a difference between the frequency (fd1') of the drive operation pattern voltage and the frequency (fd2) that maximizes the thrust acting on the movable member is not less than 3% of the frequency (fd2) that maximizes the thrust acting on the movable member.

14. The driving device as claimed in claim 13, wherein the frequency (fd1') of the drive operation pattern voltage is not lower than 0.75 times and not higher than 0.85 times the resonance frequency (fr) of the electromechanical transducer element.

15. The driving device as claimed in claim 1, wherein the sticking elimination pattern voltage is alternate repetition of a waveform that moves the movable member in a direction toward an extremity of the drive shaft and a waveform that moves the movable member in a direction toward a root of the drive shaft.

16. The driving device as claimed in claim 15, wherein the sticking elimination pattern voltage is alternate repetition of a waveform that moves the movable member in the direction toward the extremity of the drive shaft and a waveform that moves the movable member in the direction toward the root of the drive shaft, with cycles of unit time that generally corresponds to a half of a natural vibration frequency of the movable member.

17. The driving device as claimed in claim 15, wherein the sticking elimination pattern voltage has a rectangular waveform and has a duty ratio in vicinity of 0.3 or in vicinity of 0.7.

18. The driving device as claimed in claim 1, wherein the sticking elimination pattern voltage is outputted upon at least any of power-on, reset action, and suspension of output of the drive operation pattern voltage for a predetermined period of time.

* * * * *